US 12,177,945 B2

(12) United States Patent
Grünwald et al.

(10) Patent No.: US 12,177,945 B2
(45) Date of Patent: Dec. 24, 2024

(54) TEMPERATURE CONTROL ELEMENT AND SENSOR ARRANGEMENT

(71) Applicant: Conti Temic microelectronic GmbH, Nuremberg (DE)

(72) Inventors: Martin Grünwald, Ulm (DE); Franz Pfeiffer, Ulm (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 844 days.

(21) Appl. No.: 17/249,058

(22) Filed: Feb. 18, 2021

(65) Prior Publication Data

US 2021/0185769 A1 Jun. 17, 2021

Related U.S. Application Data

(63) Continuation of application No. PCT/EP2019/070374, filed on Jul. 29, 2019.

(30) Foreign Application Priority Data

Aug. 21, 2018 (DE) ............... 10 2018 214 108.8

(51) Int. Cl.
*H05B 3/26* (2006.01)
*G01S 7/02* (2006.01)
*G03B 17/55* (2021.01)
*H01Q 1/02* (2006.01)
*H01Q 1/42* (2006.01)

(52) U.S. Cl.
CPC ............... *H05B 3/267* (2013.01); *G01S 7/02* (2013.01); *G03B 17/55* (2013.01); *H01Q 1/02* (2013.01); *H01Q 1/42* (2013.01); *G01S 7/027* (2021.05); *H05B 2203/003* (2013.01)

(58) Field of Classification Search
CPC ....................................................... H01Q 1/42
See application file for complete search history.

(56) References Cited

U.S. PATENT DOCUMENTS

2006/0086710 A1 4/2006 Meiler
2013/0314540 A1 11/2013 Hacker
2016/0091714 A1 3/2016 Hui
2018/0017785 A1* 1/2018 Bulgajewski ............ H05B 3/58
(Continued)

FOREIGN PATENT DOCUMENTS

DE 10026454 C1 12/2001
DE 102010052472 A1 5/2012
(Continued)

OTHER PUBLICATIONS

Translation of KR-20180027018-A (Year: 2018).*
(Continued)

*Primary Examiner* — Elizabeth M Kerr

(57) ABSTRACT

Disclosed herein is a temperature control element for heating a sensor for detecting surroundings, having a three-dimensional plastic component, characterized in that at least one metallized structure is integrated into the plastic component or respectively provided therein, wherein the metallized structure is configured in such a manner that it assumes a heating function. A sensor arrangement for detecting surroundings is also disclosed, having a sensor for detecting surroundings as well as a temperature control element.

22 Claims, 3 Drawing Sheets

(56) References Cited

U.S. PATENT DOCUMENTS

| | | | |
|---|---|---|---|
| 2018/0084161 A1* | 3/2018 | Lee | G02B 7/028 |
| 2018/0176431 A1 | 6/2018 | Kim | |
| 2018/0210161 A1 | 7/2018 | Park | |
| 2018/0252990 A1 | 9/2018 | Kosidlo | |
| 2018/0263082 A1 | 9/2018 | Richmond | |
| 2018/0269559 A1* | 9/2018 | Celle | H05B 3/12 |
| 2018/0352120 A1* | 12/2018 | Zurowski | H05K 1/189 |
| 2020/0271889 A1 | 8/2020 | Lee et al. | |

FOREIGN PATENT DOCUMENTS

| | | | |
|---|---|---|---|
| DE | 102014002438 A1 | 8/2015 | |
| DE | 102015218876 A1 | 3/2017 | |
| DE | 102017201460 A1 | 3/2018 | |
| DE | 102017209412 A1 | 5/2018 | |
| KR | 20180027018 A * | 3/2018 | H04N 5/2257 |
| KR | 20180032699 A | 4/2018 | |
| WO | 2004047421 A2 | 6/2004 | |
| WO | 2017030351 A1 | 2/2017 | |

OTHER PUBLICATIONS

Deutsches Patent—und Markenamt Office Action Jan. 21, 2020 for the German Patent Application No. 10 2018 214 108.8.
International Search Report and the Written Opinion of the International Searching Authority mailed on Oct. 22, 2019 for the counterpart PCT Application No. PCT/EP2019/070374.
Notice of Reasons for Refusal dated Jun. 8, 2023 for the counterpart Japanese Patent Application No. 2020-568555 and Global Dossier translation of same.
Hiroyuki Kamidate, "On MID technology used for wearables", Molding and Processing, Japan Society of Plastic Molding and Processing, 2016, vol. 28, No. 1, pp. 12-17.
Decision to Grant a Patent drafted Dec. 27, 2023 for the counterpart Japanese Patent Application No. 2020-568555 and machine translation of same.
Request for the Submission of an Opinion dated Jun. 28, 2024 for the counterpart Korean Patent Application No. 0-2020-7034613 and machine translation of same.
Hiroyuki Kamidate, "MID technology used in wearables", Japan Society of Polymer Processing, Seikei-Kakou vol. 28 No. 1, 2016, pp. 12-17, and machine translation of same.

* cited by examiner

TEMPERATURE CONTROL ELEMENT AND SENSOR ARRANGEMENT

CROSS REFERENCE TO RELATED APPLICATION

This application is a continuation of PCT Application PCT/EP2019/070374, filed Jul. 29, 2019, which claims priority to German Application 10 2018 214 108.8, filed Aug. 21, 2018; the contents of all above-named applications are incorporated herein by reference.

FIELD OF INVENTION

The invention relates to a temperature control element for a sensor as well as a sensor arrangement.

BACKGROUND

Components are becoming ever more complex. On the one hand, components should be increasingly efficient. On the other hand, however, attempts are also being made to reduce the size of the components or respectively to integrate as many different functions as possible into one component. The result of this is that more and more parts or respectively elements have to be built into as small an installation space as possible, which is frequently associated with a higher temperature development or respectively temperature change, since there is not sufficient space for dissipating the heat. However, to ensure that the components are all able to function correctly, it is essential to observe component-specific temperature ranges. This is in particular guaranteed by integrating elements for removing heat or respectively for supplying heat.

The process of equipping sensors for detecting surroundings with heating elements is known from the prior art. Thus, a lens barrel may, for example, be equipped with a heating film. The film is preferably affixed to the cube. However, the disadvantage of this is that the heating film may only be adapted to the contour of the component with great difficulty, as a result of which only an unsatisfactory connection or respectively an unsatisfactory contact between the elements is created. This results in an inadequate and insecure temperature control of the sensor. In addition, the installation and electrical contacting are also quite difficult and time-consuming.

SUMMARY

Starting from this, it is an object to indicate a solution as to how a secure temperature control of components, in particular of sensors for detecting surroundings, can be created, in particular with as little constructive outlay as possible.

According to a first aspect, a temperature control element provides heating a sensor for detecting surroundings or respectively a structural element of a sensor, having a three-dimensional plastic component, wherein a metallized structure is integrated into the plastic component or respectively provided therein, and the metallized structure is configured in such a manner that it assumes a heating function. The heating function is in particular created by energizing the metallized structure.

It is advantageous that a temperature control element is created as a result, which may be produced simply, in principle in any form and configuration, as a result of which it may be adapted to a temperature-critical or respectively a temperature-regulating structural element in the best possible way and an ideal heating or respectively cooling capacity is created. The structural element or respectively the sensor may consequently be reliably adjusted to its specific temperature or respectively to its working temperature such that the functionality thereof may be guaranteed. The fact that the temperature control element according to the example embodiments has no fixed form whatsoever additionally means that it may be simply integrated into components, since it may be adapted to the available installation space. All in all, this results in an optimization of the installation space.

Although heating is in principle discussed in this specification, this should not only be understood to mean that a sensor or respectively a component may be heated up or respectively warmed by the temperature control element. It is also in principle conceivable that the temperature control element according to the example embodiments may result in cooling of the sensor or respectively of the structural element. All in all, the temperature control element according to the present disclosure is to ensure that it may hold or respectively bring the sensor at/to a pre-defined or respectively advantageous working temperature. This is in particular achieved due to the metallized structure.

A sensor for detecting the surroundings of a motor vehicle or respectively at least one structural element of a sensor for detecting the surroundings of a motor vehicle is ideally heated or respectively cooled with the temperature control element. To ensure that the sensors may detect the surroundings in the best possible way, said sensors are frequently arranged on the outer side of the motor vehicle and are consequently exposed to an extremely wide range of environmental influences. In particular, perfect vision is important for cameras. For this reason, it must be ensured that the lens does not mist up or respectively is not misted up, and is free of frost.

The temperature control element may, however, also be configured such that it is suitable for heating components which are arranged in the surroundings of the sensor. In particular, the component experiences a temperature change due to the temperature control element. The component may be a window, preferably a windshield. In particular, the temperature control element ensures that the window is mist-free. The component is advantageously arranged in a detection range of the sensor. The term 'detection range' within the meaning of the disclosure denotes, in particular, a region which is active during the detecting of the surroundings by the sensor, that is to say in particular a region through which the sensor detects the surroundings. A radar sensor denotes, in particular, a region through which the sensor receives or respectively sends signals. A camera or respectively an optical device denotes, in particular, a region which the electromagnetic beams required for illumination pass through.

The plastic component may be both a thermoplastic, a duromer or an elastomer. The plastic component is, in one aspect, an injection-molded component. Three-dimensional components having the widest possible range of shapes and configurations, combined with a very good quality or respectively surface finish, may be simply and inexpensively realized by means of injection molding.

The metallized structure is in principle not bound to any fixed design. It is configured such that a heating function is produced by it. It is in particular adapted to the respective application, that is to say in principle to the required heating function. This is effected in particular by adapting its width, its cross-section and/or its length as well as the composition of the metal coating. In principle, the heating capacity may be increased by enlarging the metallized structure or respectively maximizing the area of the metallized structure on the plastic component.

The metallized structure is configured substantially linearly. The metallized structure may have a line width of approximately 100 to 200 µm, in particular approximately 150 µm.

The metallized structure is advantageously configured in a meandering pattern or respectively extends in a meandering pattern, at least in certain regions, over the plastic component. Due to the meandering design, a particularly long conductor path may be produced and, consequently, a good heating capacity may be achieved.

It is advantageous if the metallized structure substantially extends over the entire plastic component. The metallized structure may extend uniformly over the plastic component. The advantage of this is that a uniform heating capacity is created. However, it is also conceivable that the metallized structure is only integrated into the plastic component in certain regions, that is to say in particular in those regions which adjoin a sensor or respectively a part of a sensor which requires a particular temperature control. The metallized structure integrated into the plastic component may additionally be configured or respectively formed in various different ways in different regions of the plastic component. As a result, different heating functions may be created in certain regions. It is, for example, conceivable that the metallized structuring has a design in a substantially meandering pattern, however the widths of the metallized structure in the individual regions at least partially differ from one another or respectively the distances between adjacent structurings differ. For example, in some regions, adjacent metallized structures are very close to one another, while they are further away from one another in other regions.

In particular, the line width and the distance between adjacent metallized regions may substantially correspond to one another.

The metallized structure may, for example, be configured at least partially from copper, from nickel or from gold. The metallized structure may also be configured from a mixture of various materials, as a result of which a specific resistance may be adjusted, which may be adapted to the required heating capacity or respectively heating function. Consequently, a heating function or respectively heating capacity may also be adjusted as a function of the geometric shape by the selection of the material.

It is advantageous if the plastic component is configured in such a manner that it may also contribute to the heating function or respectively heating capacity. This may in particular be achieved by selecting an appropriate plastic or respectively by selecting appropriate fillers or respectively accessory agents, in particular having a high thermal conductivity.

The metallized structure is, in one aspect, produced by means of laser structuring, in particular by means of laser direct structuring. Following production of the plastic component which preferably has an additive, those regions on which the metallized structure is provided are illuminated with a laser beam. The added additive is activated by the illumination. The component is subsequently dipped in a metal bath, for example a copper bath, as a result of which the metallized structure is configured with sharp contours. Thus, various layers may be applied after one another, as a result of which a structure which is adapted to the respective intended purpose may be produced.

The temperature control element is, in an aspect, configured as a hollow body. The temperature control element is particularly substantially configured in the form of a ring and/or in the form of a sleeve. It is advantageous that, thanks to such a design, the temperature control element surrounds the temperature-regulating sensor at least in certain regions and, consequently, a very good temperature control is possible.

In a configuration, the temperature control element has at least one coupling point or respectively at least one coupling element for connecting the metallized structure to external elements for energization. The temperature control element particularly has metallized contact surfaces which may in turn be energized, in particular by means of spring contacts.

In a design, the temperature control element nay be configured as a radome of a radar sensor. As a result, multiple functions are integrated into a structural element, which has a positive effect on the required installation space.

The temperature control element may be further configured as a lens hood.

According to a second aspect, the present disclosure relates to a sensor arrangement for detecting surroundings, having a sensor for detecting surroundings as well as a temperature control element.

It is advantageous that an optimum temperature control may be created for the sensor or respectively for a structural element of the sensor, as a result of which a reliable mode of operation of the sensor may be guaranteed overall.

The sensor is in particular deployed for detecting the vehicle surroundings and supplies, in particular, data or respectively information for driver assistance systems as well as autonomously acting systems. Especially in this case, it is important that the sensor operates reliably and detects its surroundings correctly. The sensor may be composed of multiple structural elements.

The sensor is, in an aspect, an optical device, in particular a lens module or a camera. The camera may, for example, be a mono camera or a stereo camera. The camera may be configured both as a front, side and a rear or respectively reversing camera.

The camera is, in an aspect, particularly a camera of a surround view system. The cameras of surround view systems are usually arranged on the outer side of a motor vehicle and are consequently exposed to an extremely wide range of weather conditions. However, it may also be a camera from a mirror replacement system.

However, the sensor may also be a radar sensor. The radar sensor may, for example, include a radome and a radar sensor element for sending and/or receiving signals.

In an advantageous design, the temperature control element surrounds the sensor or respectively a structural element of the sensor at least partially or respectively covers the sensor or a structural element of the sensor at least partially.

The temperature control element and the sensor or respectively at least one structural element of the sensor are arranged immediately together or respectively immediately adjoin one another. This is in particular to be understood to mean that the temperature control element and the sensor or respectively the structural element of the sensor touch or respectively contact one another. Said touching or respectively contacting occurs in particular at least in the region of the metallized structure of the temperature control element. As a result, an optimum heating function may be achieved.

In an advantageous design, the temperature control element encloses the sensor or respectively at least one structural element of the sensor. The temperature control element may be configured, for example, as a hollow body, in particular as a hollow cylinder or as an annular element. The temperature control element may in principle be considered to be a type of sleeve.

In an advantageous design, the temperature control element is positively connected to the sensor or respectively at least one structural element of the sensor.

It is also possible that the temperature control element is configured as a structural element of the sensor, in particular as a radome.

In an advantageous design of the sensor arrangement, the temperature control element may be arranged in a detection range of the sensor.

The temperature control element may in principle be used for heating a sensor for detecting the surroundings of a motor vehicle or at least one structural element of a sensor or respectively for heating another component which is located in the immediate detection range of the sensor.

It is conceivable that the temperature control element is used as a lens hood. It is also conceivable that the temperature control element is utilized as a radome.

BRIEF DESCRIPTION OF THE DRAWINGS

Further advantageous configurations are set out by the drawings, wherein.

DETAILED DESCRIPTION

Figure 1:
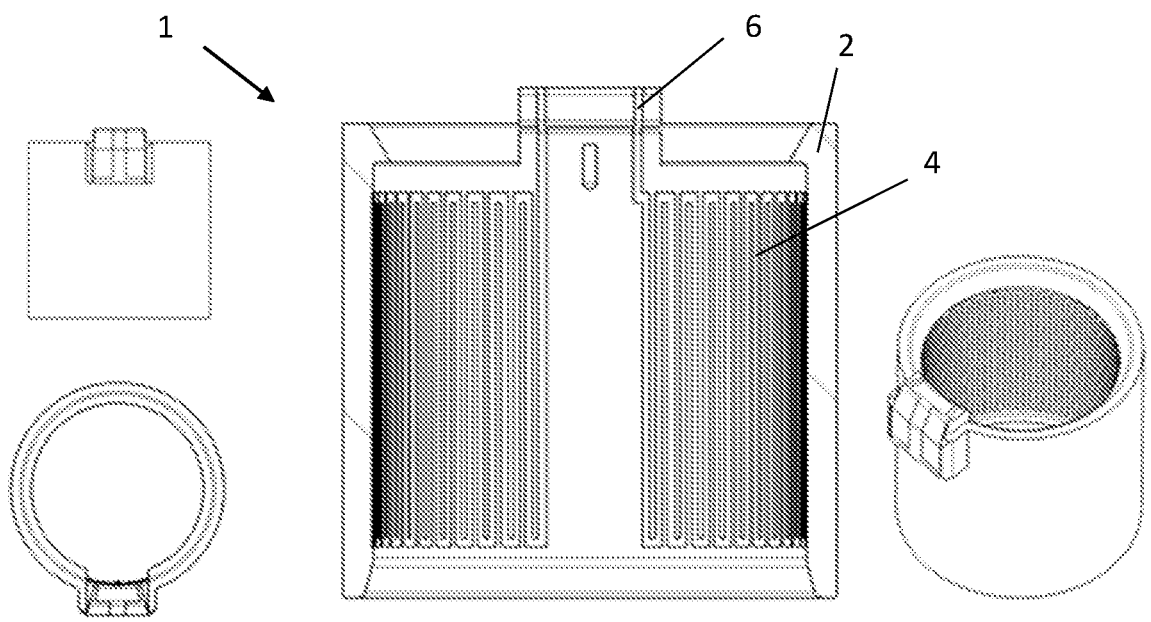
FIG. 1: shows a schematic representation of a temperature control element in an embodiment in multiple views.

FIG. 1 shows a schematic representation of a temperature control element 1 for heating a sensor in an embodiment in multiple views, wherein a side view of a temperature control element 1 is represented top left, a top view of a temperature control element 1 is represented bottom left, a side view (cross-sectional view) of a temperature control element is represented in the center, wherein a plastic component 2 has been partially omitted, and a three-dimensional view of a temperature control element 1 is represented on the right.

The temperature control element 1 according to the example embodiments includes a three-dimensional plastic component 2, wherein at least one metallized structure 4 is integrated into the plastic component 2. The metallized structure 4 is configured in such a manner that it may be energized, as a result of which it assumes a heating function.

The plastic component 2 is, in an aspect, an injection-molded component, wherein the plastic may be any of a thermoplastic, a duromer or an elastomer.

The metallized structure 4 is configured in a meandering pattern and extends substantially over the entire plastic component 2 or respectively over the entire lateral surface of the plastic component 2. Only a small region of the lateral surface of the plastic component 2 does not have a metallized structure 4. As a result, a particularly good heating capacity may be achieved.

The line width of the metallized structure 4 is, in one aspect, approximately 150 µm. The metallized structure 4 may at least be partially configured from copper, from nickel or from gold.

The temperature control element 1 is, in an aspect, configured as a hollow body. The advantage of this is that it encloses a temperature-regulating sensor, as a result of which a very good heat transfer may take place.

The temperature control element 1 shown in FIG. 1 additionally has a coupling point 6 for connecting the metallized structure 4 to external elements for energization.

The temperature control element 1 is, in an aspect, used for heating a sensor 10 for detecting the surroundings of a motor vehicle or a structural element of a sensor 10 for detecting the surroundings.

Figure 2:
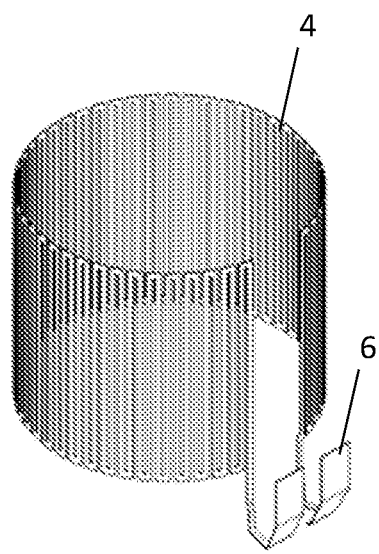
FIG. 2: shows a schematic representation of a metallized structure in an embodiment.

FIG. 2 shows a schematic representation of a metallized structure 4 in an embodiment. The meandering design or respectively the uniform course of the metallized structure 4 is particularly well visible here. The coupling point 6 is also represented. This is represented as a hook or respectively clip element. As a result, a connection to external elements may be established particularly well and securely.

Figure 3:
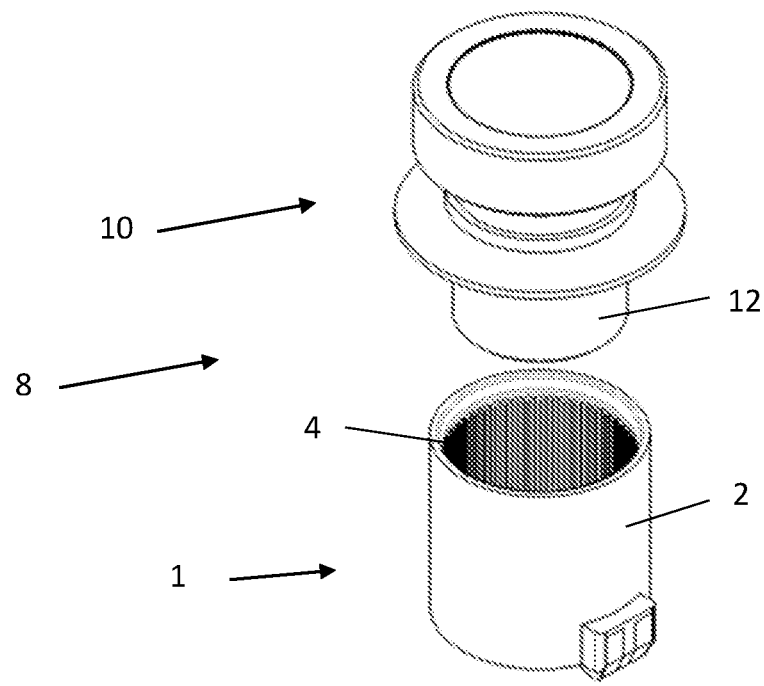
FIG. 3: shows a schematic representation of a sensor arrangement in an embodiment.

FIG. 3 shows a schematic representation of a sensor arrangement 8 in an embodiment. The sensor arrangement 8 is composed of a temperature control element 1 according to the example embodiment and a sensor 10. The sensor 10 shown in FIG. 3 is a lens module which includes a lens barrel 12.

The temperature control element 1 is configured as a hollow body and encloses at least a part, in particular a structural element of the sensor 10, namely the lens barrel 12. The temperature control element 1 constitutes a type of sleeve with respect to the sensor or respectively the lens barrel 12. The temperature control element 1 and the sensor 10 immediately adjoin one another. A positive fit is provided. As a result, a particularly good heat transfer may be ensured.

Figure 4:
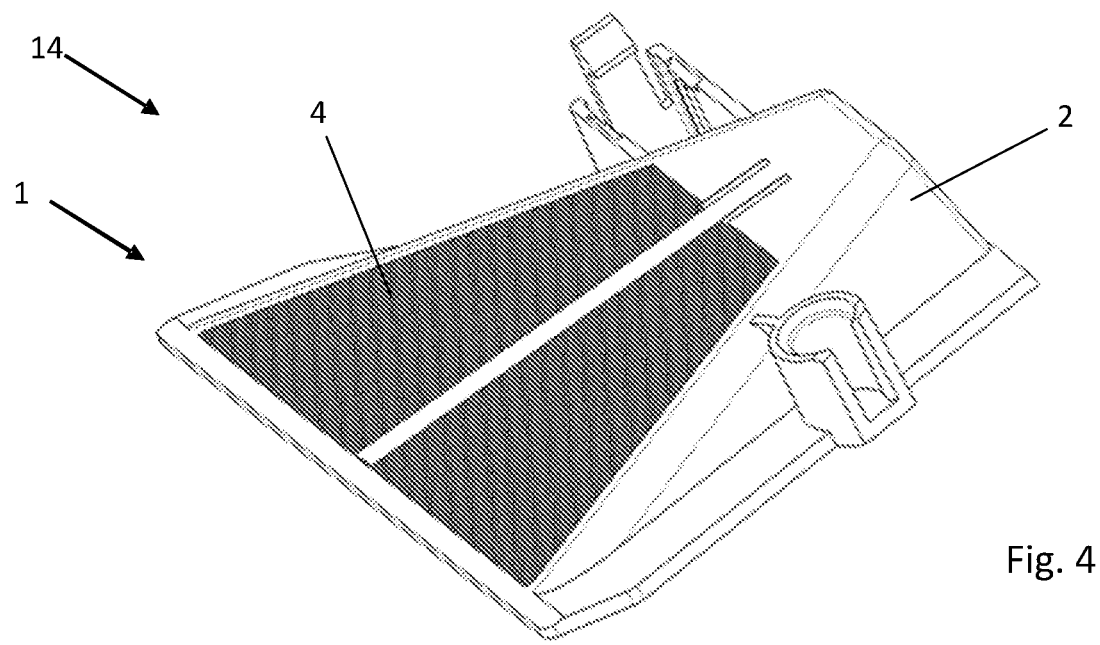
FIG. 4: shows a schematic representation of a temperature control element in a further embodiment.

FIG. 4 shows a schematic representation of a temperature control element 1 in a further embodiment, wherein the temperature control element 1 is configured as a lens hood 14.

Figure 5:
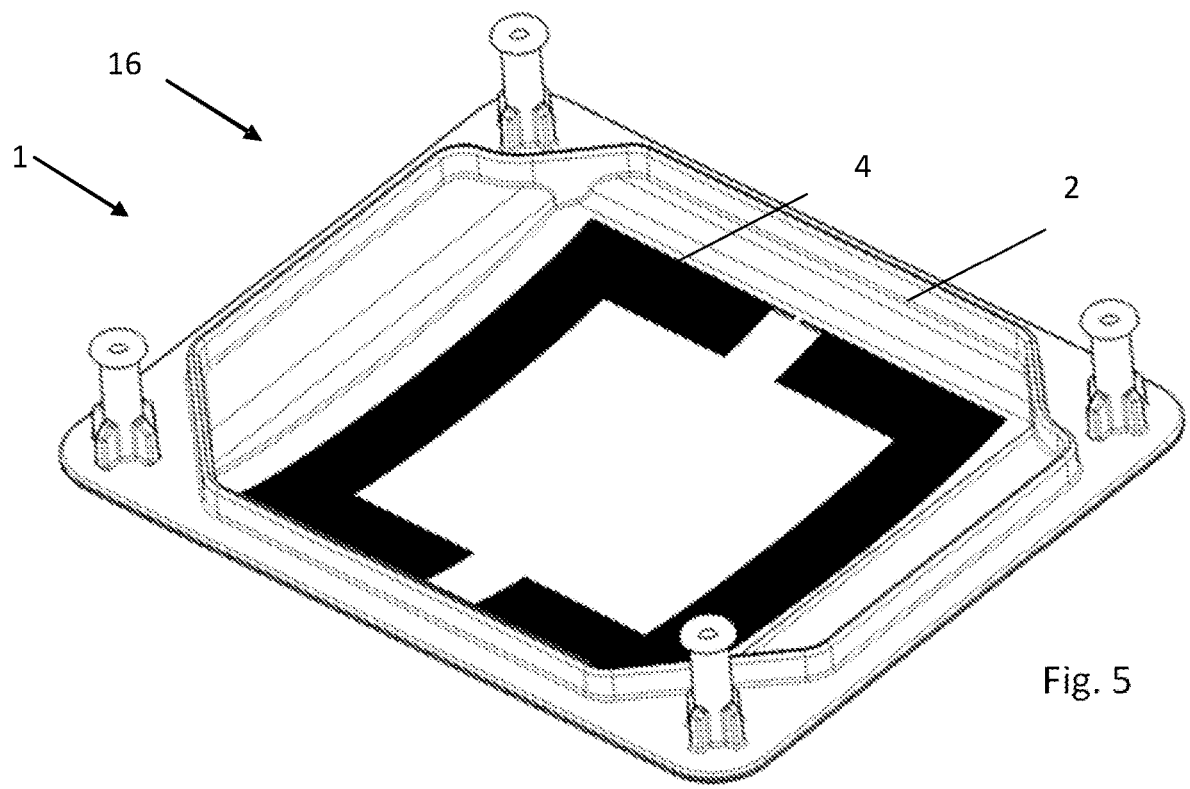
FIG. 5: shows a schematic representation of a temperature control element in yet another embodiment.

FIG. 5 shows a schematic representation of a temperature control element 1 in yet another embodiment. The temperature control element 1 represented in FIG. 5 is configured as a radome 16 of a radar sensor.

Figure 6:
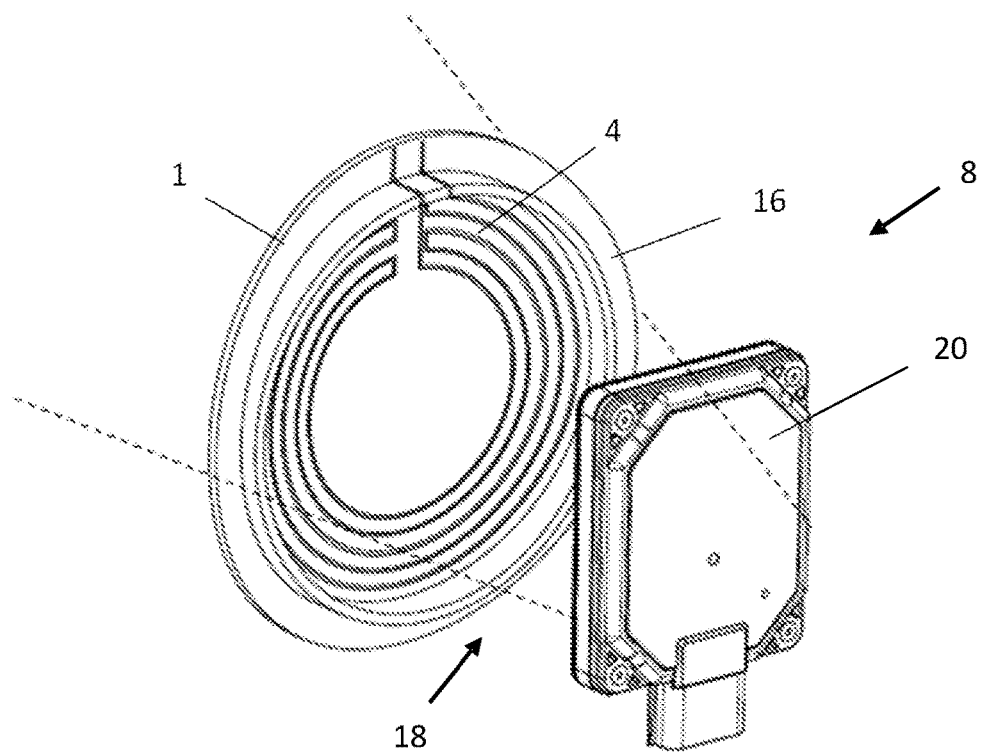
FIG. 6: shows a schematic representation of a sensor arrangement in a further embodiment.

FIG. 6 shows a schematic representation of a sensor arrangement 8 in a further embodiment. The sensor arrangement 8 includes a temperature control element 1 and a radar sensor 18 which has at least one radar sensor element 20 and a radome 16. Here, the temperature control element 1 is configured as a component of the radar sensor 18, namely as a radome 16. Metallized structures 4 are configured in the radome 16.

A detection range is additionally schematically represented in FIG. 6 (see region between the dashed lines). Signals are substantially sent or respectively received by the radar sensor element 20 through this region.

The invention has been described above with reference to exemplary embodiments. It is understood that numerous amendments as well as variations are possible, without departing from the scope of protection defined by the claims. A combination of the various exemplary embodiments is also possible.

LIST OF REFERENCE NUMERALS

1 Temperature control element
2 Plastic component

4 Metallized structure
6 Coupling point
8 Sensor arrangement
10 Optical device
12 Lens barrel
14 Lens hood
16 Radome
18 Radar sensor
20 Radar sensor element

The invention claimed is:

1. A temperature control element for heating a sensor for detecting surroundings or respectively at least one component of a sensor for detecting surroundings, comprising
a three-dimensional plastic component having a cylindrical shape, and
at least one metallized structure that is integrated into the plastic component or provided therein,
wherein the at least one metalized structure is configured such that the at least one metalized structure assumes a heating function, the at least one metalized structure has a meandering pattern that extends over at least one surface of the plastic component, and
a pair of coupling points, each connecting the at least one metallized structure to one or more elements external to the three-dimensional plastic component for energization of the metalized structure, a distal end portion of each coupling point being disposed externally to the three-dimensional plastic component and extending over or around a fire longitudinal end of the three-dimensional plastic component opposite a second longitudinal end of the of the three-dimensional plastic component in or on which the sensor is disposed.

2. The temperature control element according to claim 1, wherein the metallized structure is produced by means of laser direct structuring.

3. The temperature control element according to claim 1, wherein the temperature control element is configured as a hollow body.

4. The temperature control element according to claim 1, wherein each coupling point has a hook shape and the distal end portion extends towards the second longitudinal end of the of the three-dimensional plastic component from the first longitudinal end thereof.

5. The temperature control element according to claim 1, wherein the temperature control element is configured as a lens hood or as a radome.

6. The temperature control element according to claim 1, wherein the at least one metalized structure comprises:
a plurality of elongated metalized segments that are spaced apart from each other, the elongated metalized segments extending in the same direction; and
a plurality of connecting metalized segments, each connecting metalized segment connecting ends of two adjacent elongated metalized segments,
wherein the elongated metalized segments and the connecting metalized segments are series-connected and form a single metalized electrical component having a resistance corresponding to a sum total of resistances of each of the elongated metalized segments and each of the connecting metalized segments, and the heating function is based at least in part upon the resistance of the single metalized electrical component.

7. A sensor arrangement for detecting surroundings, comprising a sensor for detecting surroundings, and a temperature control element comprising a three-dimensional plastic component, wherein at least one metallized structure is integrated into the three-dimensional plastic component or provided therein, and wherein the metallized structure is configured such that it assumes a heating function, the at least one metalized structure having a meandering pattern that extends over at least one surface of the three-dimensional plastic component, wherein the at least one metalized structure comprises:
a plurality of elongated metalized segments that are spaced apart from each other, the elongated metalized segments extending in the same direction; and
a plurality of connecting metalized segments, each connecting metalized segment connecting ends of two adjacent elongated metalized segments, and wherein the elongated metalized segments and the connecting metalized segments are series-connected to form a single metalized electrical component having a resistance corresponding to a sum total of resistances of the elongated metalized segments and the connecting metalized segments, and the heating function is based at least in part upon the resistance of the single metalized electrical component,
wherein the three-dimensional plastic component has a cylindrical shape, and
wherein the temperature control element further comprises a pair of coupling points for connecting the metallized structure to elements external to the three-dimensional plastic component for energization of the metalized structure, a distal end portion of each coupling point being disposed externally to the three-dimensional plastic component and extending over or around a first longitudinal end of the three-dimensional plastic opposite a second longitudinal end of the of the three-dimensional plastic component in or on which the sensor is disposed.

8. The sensor arrangement according to claim 7, wherein the sensor is an optical device.

9. The sensor arrangement according to claim 8, wherein the sensor comprises a camera or a radar sensor.

10. The sensor arrangement according to claim 7, wherein the temperature control element at least partially surrounds the sensor.

11. The sensor arrangement of claim 7, wherein the temperature control element encloses the sensor.

12. The sensor arrangement according to claim 7, wherein the temperature control element and the sensor immediately adjoin one another.

13. The sensor arrangement according to claim 7, wherein the temperature control element is positively connected to the sensor.

14. The sensor arrangement according to claim 7, wherein the temperature control element is arranged in a detection range of the sensor.

15. The sensor arrangement according to claim 7, wherein each coupling point having has a hook shape and the distal end portion extends towards the second longitudinal end of the of the three-dimensional plastic component from the first longitudinal end thereof.

16. The sensor arrangement according to claim 7, wherein the temperature control element is configured as a hollow body.

17. The sensor arrangement according to claim 7, wherein the temperature control element is configured as a lens hood or as a radome.

18. The sensor arrangement according to claim 7, wherein the metalized structure is disposed along an interior surface of the three-dimensional plastic component, and the distal end portion of each coupling point extends along an exterior surface of the three-dimensional plastic component towards the second longitudinal end of the of the three-dimensional plastic component from the first longitudinal end thereof such that the distal end portion of each coupling point provides for connection to an electrical component external to the sensor arrangement at the first longitudinal end of the three-dimensional plastic component along the exterior surface thereof for energization of the metalized structure.

19. A method for at least one of heating or cooling a sensor which detects surroundings of a motor vehicle, the method comprising:
obtaining a temperature control element, the temperature control element comprising a three-dimensional plastic component and at least one metallized structure integrated into the three-dimensional plastic component or provided therein, the at least one metallized structure is configured to provide at least one of a heating function or a cooling function, the metalized structure having a meandering pattern that extends over at least one surface of the three-dimensional plastic component;
connecting the temperature control element to a sensor;
providing at least one coupling point electrically coupled to the at least one metallized structure; and
energizing the at least one metallized structure via the at least one coupling point,
wherein the at least one metalized structure comprises:
a plurality of elongated metalized segments that are spaced apart from each other, the elongated metalized segments extending in the same direction; and
a plurality of connecting metalized segments, each connecting metalized segment connecting ends of two adjacent elongated metalized segments, and
wherein the elongated metalized segments and the connecting metalized segments are series-connected to form a single metalized electrical component having a resistance corresponding to a sum total of resistances of the elongated metalized segments and the connecting metalized segments, and the heating function is based at least in part upon the resistance of the single metalized electrical component,
wherein the three-dimensional plastic composition has a cylindrical shape, and
wherein the at least one coupling point comprises a pair of coupling points for connecting the metallized structure to elements external to the three-dimensional plastic component for energization of the metalized structure, a distal end portion of each coupling point being disposed externally to the three-dimensional plastic component and extending over or around a first longitudinal end of the three-dimensional plastic component opposite a second longitudinal end of the of the three-dimensional plastic component in or on which the sensor is disposed.

20. The method according to claim 19, wherein connecting the temperature control element comprises directly contacting the temperature control element with the sensor.

21. The method according to claim 19, wherein connecting the temperature control element comprises enclosing at least a portion of the sensor, the portion of the sensor being disposed in a cavity defined by the temperature control element.

22. The method according to claim 19, wherein the temperature control element comprises a lens hood or a radome of the sensor.

* * * * *